United States Patent [19]

Lehman et al.

[11] 4,155,678
[45] May 22, 1979

[54] WHEELBARROW TRANSPORT VEHICLE

[75] Inventors: Maurice E. Lehman, 1960 Horseshoe Rd., Lancaster, Pa. 17601; Roland P. Gehman, Stevens; Kenneth E. Mohler, Mohnton; Donald H. Straub, Mt. Joy, all of Pa.

[73] Assignee: Maurice E. Lehman, Lancaster, Pa.

[21] Appl. No.: 880,940

[22] Filed: Feb. 24, 1978

[51] Int. Cl.² .............................. B60P 1/24; B60P 3/00
[52] U.S. Cl. ................................ 414/483; 280/179 R; 280/402; 280/476 R; 414/537
[58] Field of Search .................. 214/85, 505, 85.1; 296/1 A; 280/179 R, 402, 476 R, 400

[56] References Cited

U.S. PATENT DOCUMENTS 3,817,556  6/1974  Nyman ............................ 280/400
4,052,079  10/1977  Lehman ....................... 280/476 R

*Primary Examiner*—Robert G. Sheridan
*Attorney, Agent, or Firm*—B. P. Fishburne, Jr.

[57] ABSTRACT

A low profile trailer dolly having separated rear wheels and a forward end draft tongue is adapted to be drawn by a garden tractor. The trailer dolly has a pivoted ramp member at its transverse center upon which the wheelbarrow wheel is rolled to elevate the wheelbarrow and nest its wheel between the ramp member and an adjustable supporting bar on the frame of the trailer dolly. Support platforms for the wheelbarrow legs and a leg locking device are provided adjacent to the inner sides of the wheels of the trailer dolly. The device enables a conventional wheelbarrow to serve the purpose of a small wagon around the home or farm.

10 Claims, 6 Drawing Figures

U.S. Patent  May 22, 1979  Sheet 1 of 2  4,155,678
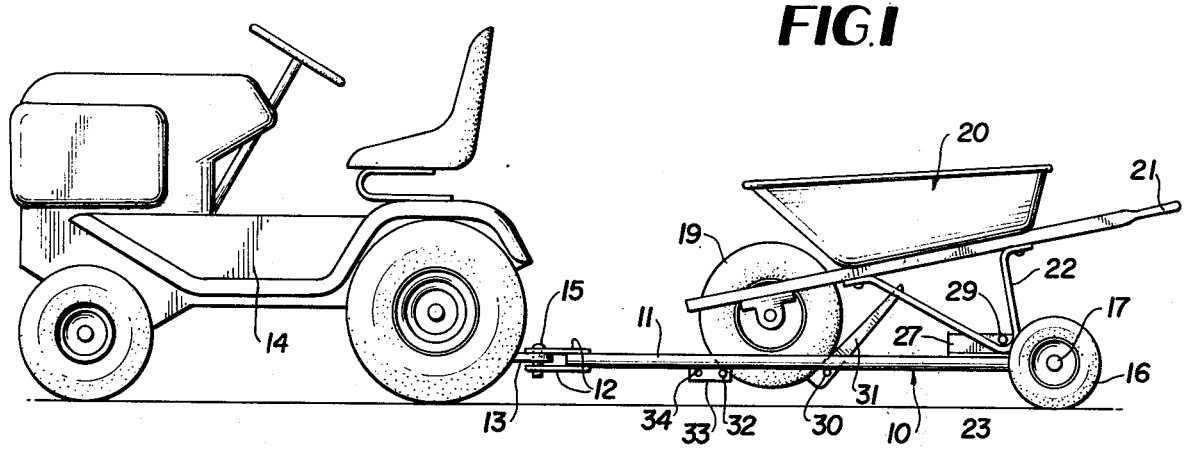
FIG.1
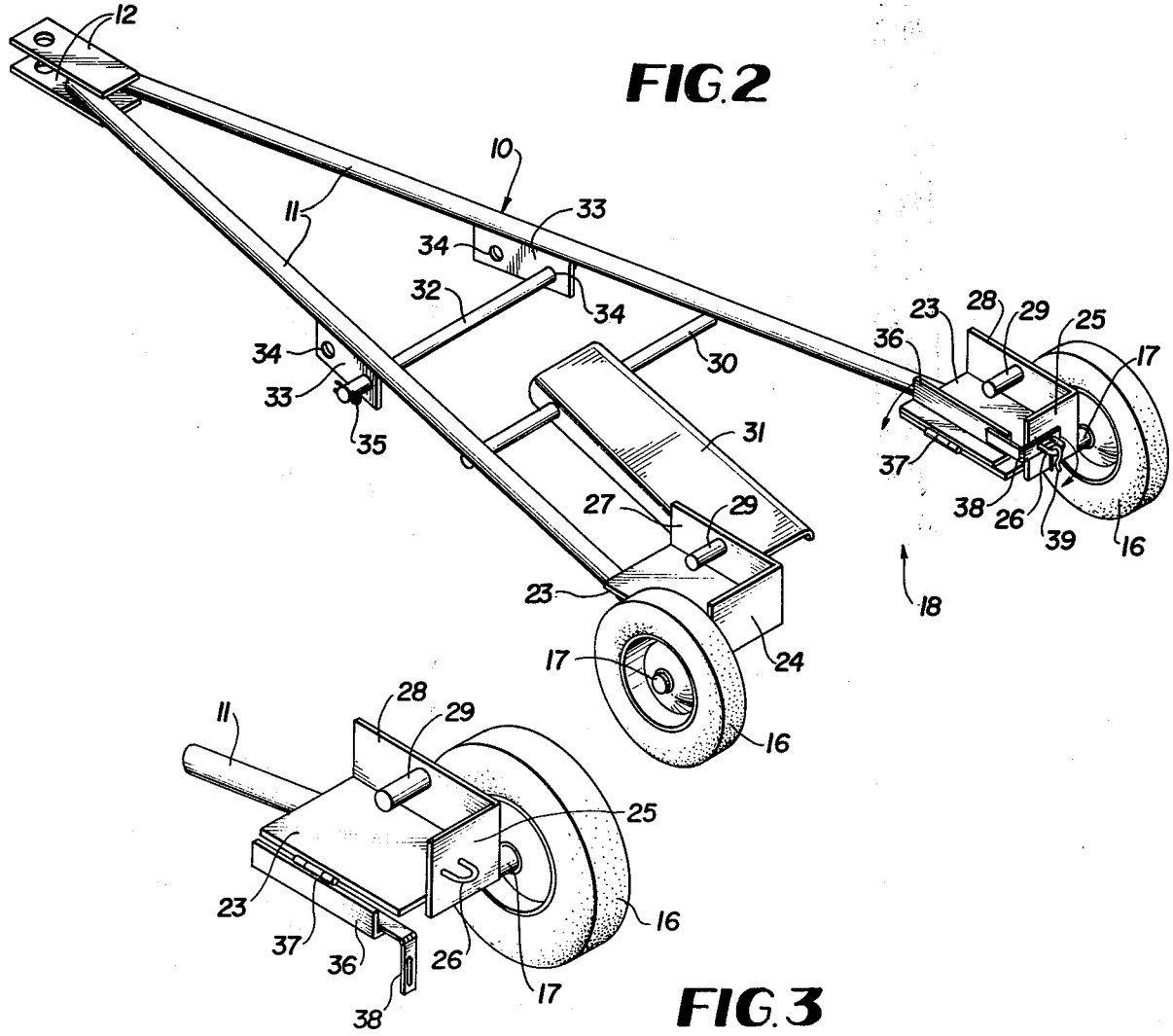
FIG.2
FIG.3

4,155,678

WHEELBARROW TRANSPORT VEHICLE

BACKGROUND OF THE INVENTION

The invention has arisen as a result of a need for a low cost transport means for heavy materials around the home or farm. Even the smallest farm wagons require an investment of several hundred dollars to purchase and are not entirely suitable for small hauling applications where a garden tractor is employed for towing. Moving heavy material, such as sand, for substantial distances by means of a wheelbarrow in the customary manner is very difficult and not practical.

The present invention satisfies the need for a low cost haulage vehicle for home and farm usage by providing a very simple low profile dolly having an A-frame adapted for connection with the drawbar of a farm tractor and having a pair of comparatively widely spaced rear wheels with an unobstructed passage therebetween. A small ramp member is positioned between the rear wheels and pivoted at its forward end to the A-frame for swinging in a vertical plane. The wheelbarrow wheel is rolled up on the pivoted ramp which tilts forwardly on its pivot and positions the wheelbarrow wheel in stable cradled relationship between the ramp and an adjustable transverse bar ahead of it on the A-frame. The legs of the wheelbarrow are rested on two small platforms immediately inwardly of the rear dolly wheels and the legs are locked beneath transverse pin elements spaced slightly above the platform surfaces. A coacting locking device on one leg platform of the dolly prevents lateral displacement of the wheelbarrow legs during transport.

To comply with the duty to disclose relevant prior art under 37 C.F.R. 1.56, the following United States patents are made of record herein: U.S. Pat. Nos. 3,625,545; 3,817,556; 3,785,517; 4,032,167; 4,052,079.

Other features and advantages of the invention will become apparent to those skilled in the art during the course of the following detailed description.

BRIEF DESCRIPTION OF THE DRAWINGS

FIG. 1 is a side elevation of the invention during use with a garden tractor for transporting a wheelbarrow.

FIG. 2 is a perspective view of the wheelbarrow transport dolly or vehicle embodying the invention.

FIG. 3 is a fragmentary perspective view of wheelbarrow leg locking means.

DETAILED DESCRIPTION

Figure 4:
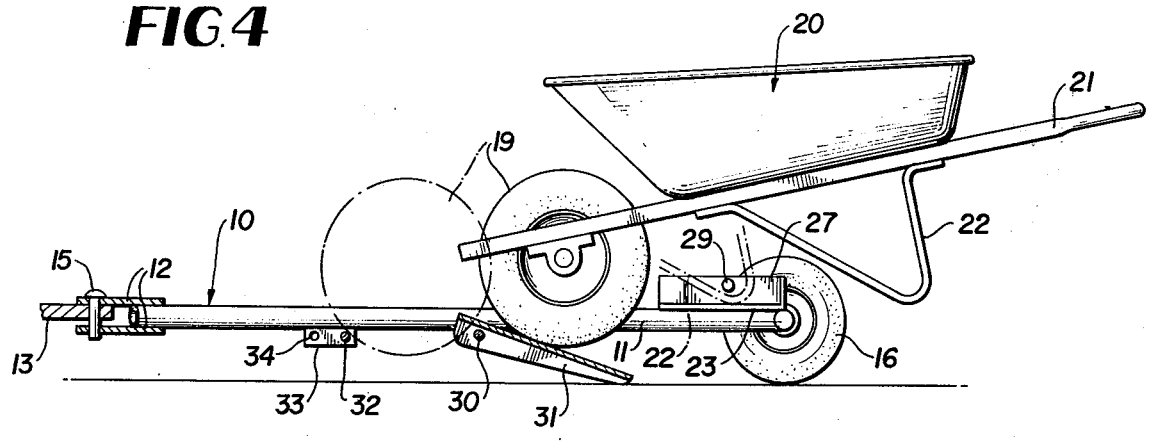
FIG. 4 is a longitudinal vertical section taken through the dolly and illustrating the operation of moving a wheelbarrow onto the dolly for transport purposes.

Referring to the drawings in detail, wherein like numerals designate like parts, a wheelbarrow transport dolly or vehicle 10 comprises an A-frame having forwardly converging frame bars 11 rigidly connected at their forward ends as by welding to a pair of apertured draft tongue plates 12 adapted to receive between them the drawbar 13 of a conventional garden tractor 14 during the use of the invention. A suitable coupling pin 15 is utilized to connect the tractor drawbar 13 to the tongue plates 12.

A pair of wide stance low profile rubber tired wheels 16 support the rear of the dolly 10 in a horizontal attitude during use with the frame bars 11 comparatively close to the ground. The rear wheels 16 are journaled on short transverse axles 17 which are preferably welded to the rear ends of the frame bars 11. A quite wide unobstructed passage 18 is provided between the rear wheels 16 for the free passage of the front wheel 19 onto the dolly 10 in a manner to be further described. The wheelbarrow 20 is conventional and has the usual rear handles 21 and laterally spaced rear support legs 22 of open loop or modified V configuration.

Fixedly secured to the axles 17 and frame bars 11 by welding and arranged immediately inwardly of the wheels 16 and slightly forwardly of their axles are small level platforms 23 for the support of the wheelbarrow legs 22 during use of the invention to transform the wheelbarrow into a small haulage truck or wagon of general utility around the home or farm. The fixed platforms 23 have upstanding rear walls 24 and 25 rigid therewith, the wall 25 carrying a hasp keeper 26 whose use will be described. One platform 23 has an inner side vertical wall 27 rising thereabove at right angles to the rear wall 24 and platform. The other platform 23 has a corresponding outer side wall 28 similarly rising therefrom and disposed at right angles to the rear wall 25. Comparatively short rigid transverse wheelbarrow positioning and hold-down pins 29 are secured to the two side walls 27 and 28 forwardly of the rear walls 24 and 25 and project above and across the platforms 23 near their longitudinal centers. The two pins 29 terminate near the transverse centers of the platforms 23 as best shown in FIGS. 5 and 6, to provide space for the placement of the wheelbarrow legs 22 on the dolly platform at proper times.

Considerably forwardly of the platforms 23 and near the longitudinal center of the dolly 10, a fixed transverse bar 30 is welded preferably to the bottoms of the frame bars 11 and serves as the support and pivot for an inverted channel cross section ramp member 31 spaced midway between the rear wheels 16. The ramp member 31 is pivoted near and rearwardly of its forward end to the bar 30, and gravity causes the rear end of the ramp member to normally rest on the ground and to be inclined upwardly and forwardly from a point near the forward ends of the platforms 23. Spaced forwardly of the bar 30 and parallel thereto is an adjustable transverse support bar 32 of rigid construction. The support bar 32 has its ends held in openings of opposite side support plates 33 depending from the frame bars 11 and welded thereto. The plates 33 have fore and aft pairs of openings 34 formed therein whereby the bar 32 may be selectively placed in either of two positions away from the fixed bar 30. The purpose of this adjustment is to enable the dolly to accommodate wheelbarrow wheels 19 of varying diameters. The adjustable bar 32 is equipped with a cotter pin 35 or the like to secure it against endwise displacement.

A blocking angle bar 36 is hinged at 37 to the interior side of one platform 23 to prevent lateral displacement or shifting of the wheelbarrow legs 22 appreciably on the platforms 23 during transport of the wheelbarrow so that the legs 22 cannot be displaced laterally from beneath the hold-down pins 29 which are engaging through them.

Figure 5:
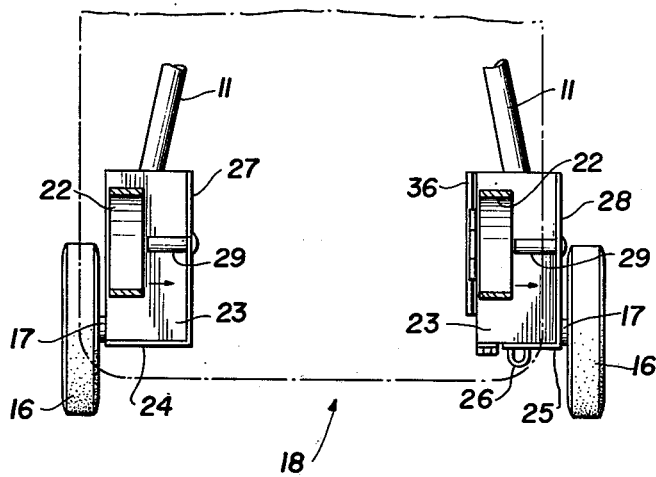
FIG. 5 is a fragmentary plan view of the rear end of the dolly with the wheelbarrow legs in cross section to illustrate the positioning of the legs on dolly platforms.
Figure 6:
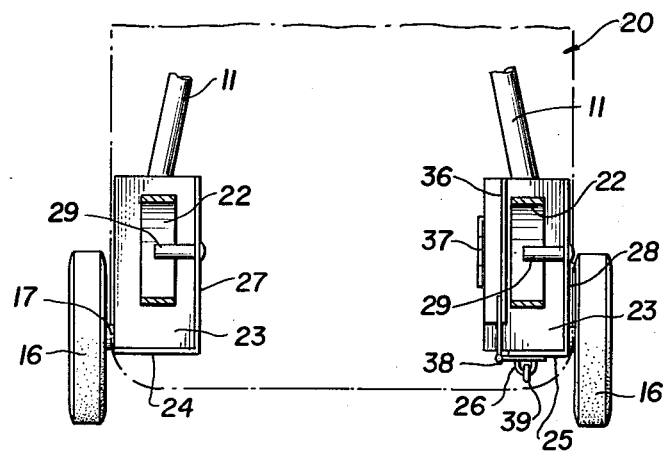
FIG. 6 is a view similar to FIG. 5 showing the wheelbarrow legs shifted into locked positions on the dolly platforms.

When the blocking angle bar 36 is inactive, FIG. 3, it simply hangs beneath the adjacent platform 23 so as not to interfere with the placement of the legs 22 onto the platforms, FIG. 5, and the lateral shifting of the legs to positions beneath the restraining pins 29, FIG. 6. When the blocking angle bar 36 is swung upwardly on its hinge 37 to the active position, FIGS. 2 and 6, it overlaps the platform 23 and rests thereon in parallel relationship to the side wall 28 and right angular relationship to the rear wall 25. A locking hasp 38 is provided on the rear of blocking angle bar 36 for locking engagement with the keeper 26, as illustrated. The hasp 38 is releasably held in the locked position by a spring clip 39, or any similar means.

During usage, the dolly 10 is coupled to the garden tractor as shown in FIG. 1. The ramp member 31 will assume its normal inclined position, FIGS. 2 and 4, with its rear end resting on the ground. The bar 32 will have been preadjusted to accommodate a given size wheelbarrow wheel, as previously explained. The blocking angle bar 36 is in the release position of FIG. 3. The empty or loaded wheelbarrow 20 is now rolled forwardly so that its wheel 19 will pass through the space 18 and engage and roll up onto the ramp member 31, as depicted in FIG. 4. When the wheel 19 passes forwardly of dead center with respect to the pivot axis of the ramp member 31, the ramp member will pivot upwardly and forwardly to a wheel cradling position as shown in FIG. 1 and the wheel 19 will be supported in a secure and stable manner between the bar 32 and the tilted ramp member 31. The wheelbarrow legs 22 are now over the platforms 23 and are merely lowered into supportive engagement with the two platforms, FIG. 5, while arranged to clear the ends of restraining pins 29. Following this, the legs 22 are shifted to positions under the pins 29, FIG. 6, and the leg blocking angle bar 36 is swung to the active position shown in FIGS. 2 and 6 and locked by means of the hasp 38, as previously explained. The caravan in FIG. 1 can now travel at a reasonable speed over irregular ground without any danger of the wheelbarrow upsetting or becoming dislodged from the transport dolly 10. The wide rear wheel stance of the dolly renders it very stable during transport. The wheelbarrow legs 22 cannot be displaced upwardly because of the pins 29 and cannot be displaced appreciably laterally because of the side walls 27 and 28 and the blocking angle bar 36.

The simplicity and convenience of the invention and its utility for converting a wheelbarrow to a general purpose haulage wagon will be understood by those skilled in the art.

It is to be understood that the form of the invention herewith shown and described is to be taken as a preferred example of the same, and that various changes in the shape, size and arrangement of parts may be resorted to, without departing from the spirit of the invention or scope of the subjoined claims.

We claim:

1. A transport vehicle for a wheelbarrow having a front wheel and a pair of laterally spaced rear support legs of loop formation, said transport vehicle comprising a pair of laterally spaced frame bars, draft coupling means carried by the forward ends of said bars adapting said vehicle to be drawn by a tractor, a pair of rear wheels carried by the rear ends of the frame bars in laterally spaced relationship, wheelbarrow leg support platforms secured to said frame bars near the interior sides of said wheels, said vehicle having an unobstructed longitudinal passage between said wheels and platforms, a longitudinally extending vertically tiltable ramp member between said platforms and wheels and extending substantially forwardly thereof and pivoted near and rearwardly of its forward end to said frame bars on a transverse pivot axis, whereby the ramp member is normally held by gravity in an inclined position with its rear end resting on the ground, and a coacting transverse wheelbarrow wheel support bar spaced forwardly of the forward end of said ramp member and secured to said frame bars and forming with the ramp member a cradle support for a wheelbarrow wheel with the forward end portion of the ramp member then depressed by the wheelbarrow wheel and the rear end of the ramp member elevated due to the weight of the wheelbarrow wheel.

2. A transport vehicle for a wheelbarrow as defined in claim 1, and a second transverse bar parallel to said support bar and spaced rearwardly thereof and having its ends secured to said frame bars and forming the pivot for said tiltable ramp member.

3. A transport vehicle for a wheelbarrow as defined in claim 2, and a pair of support plates on said frame bars and each having spaced apertures, and said wheelbarrow wheel support bar adapted for supportive engagement selectively in different aligned apertures of said plates whereby the spacing of such support bar from the ramp member may be adjusted to accommodate different sizes of wheelbarrow wheels.

4. A transport vehicle for a wheelbarrow as defined in claim 1, and a pair of transverse wheelbarrow leg restraining elements on said platforms and spaced above the bottoms of the platforms and extending partially across the platforms.

5. A transport vehicle for a wheelbarrow as defined in claim 4, and a wheelbarrow leg blocking bar hinged to one platform and swingable to a blocking position above and near one side of such platform, whereby a wheelbarrow leg on such platform cannot shift laterally sufficiently to escape the restraining action of the adjacent restraining element.

6. A transport vehicle for a wheelbarrow as defined in claim 5, and means to lock said blocking bar releasably in said blocking position.

7. A transport vehicle for a wheelbarrow as defined in claim 6, and said means comprising a hasp on said blocking bar and coacting keeper means on said platform.

8. A transport vehicle for a wheelbarrow as defined in claim 4, and said restraining elements comprising a pair of transverse horizontal pins, and side walls rising from said platforms and supporting said pins, one platform side wall being disposed at the interior side of the platform away from the adjacent rear wheel of the vehicle, and the other platform side wall being disposed at the outer side of the platform which is nearest to the adjacent wheel.

9. A transport vehicle for a wheelbarrow as defined in claim 1, and said frame bars being in converging relationship toward their forward ends, and said draft coupling means comprising a pair of spaced upper and lower apertured plates welded to the tops and bottoms of the converging ends of said frame bars.

10. A transport vehicle for a wheelbarrow as defined in claim 5, and said blocking bar comprising an angle bar hinged along the inner longitudinal edge of said platform and adapted to hang freely below the platform in a non-use position and to rest solidly on the platform near said inner longitudinal edge while in said blocking position, and means to releasably lock said blocking bar in said blocking position.

* * * * *